United States Patent
Ger et al.

(10) Patent No.: US 10,648,903 B2
(45) Date of Patent: May 12, 2020

(54) METHOD AND SYSTEM FOR MEASURING PHOTOTHERMAL DEFLECTION

(71) Applicant: Chung Yuan Christian University, Taoyuan (TW)

(72) Inventors: Tzong-Rong Ger, Taoyuan (TW); Shyh-Liang Lou, Taoyuan (TW); Szu-Yu Lin, Taoyuan (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 0 days.

(21) Appl. No.: 16/046,597

(22) Filed: Jul. 26, 2018

(65) Prior Publication Data
US 2019/0033200 A1    Jan. 31, 2019

(30) Foreign Application Priority Data
Jul. 29, 2017 (TW) .............................. 106125647 A (51) Int. Cl.
*G01N 21/17* (2006.01)
*G01K 17/02* (2006.01)
*G01K 17/00* (2006.01)

(52) U.S. Cl.
CPC ........... *G01N 21/171* (2013.01); *G01K 17/00* (2013.01); *G01K 17/02* (2013.01); *G01N 2021/1714* (2013.01)

(58) Field of Classification Search
CPC .................. G01K 17/00; G01K 17/02; G01N 2021/1714; G01N 21/171
USPC ................................. 356/432–448, 213–236
See application file for complete search history.

(56) References Cited

U.S. PATENT DOCUMENTS

| | | | |
|---|---|---|---|
| 3,422,678 A * | 1/1969 | Murray | ................... G01J 5/524 374/126 |
| 4,468,136 A | 8/1984 | Murpha et al. | |
| 4,522,510 A | 6/1985 | Rosencwaig et al. | |
| 4,540,285 A | 9/1985 | Amer | |
| 4,591,272 A | 5/1986 | Morris et al. | |
| 4,830,502 A | 5/1989 | Saito et al. | |
| 7,075,058 B2 | 7/2006 | Chinn et al. | |
| 2015/0204556 A1* | 7/2015 | Kusukame | ......... B60H 1/00742 165/237 |

FOREIGN PATENT DOCUMENTS

CN          105737982 B      6/2018

* cited by examiner

*Primary Examiner* — Tri T Ton
(74) *Attorney, Agent, or Firm* — Chun-Ming Shih; Lanway IPR Services (57) ABSTRACT

A photothermal deflection measuring system includes a substrate, a detecting light source, a detecting unit, and a processor. The substrate includes a plurality of positioning structures, on each of which supports a cell emitting heat outside a surface thereof. The detecting light source is utilized to project a detecting light passing through a specific position outside the surface whereby the detecting light is deflected due to a thermal gradient caused by the emitted heat. The detecting unit is arranged at a side of the cell for receiving the deflected detecting light thereby generating an optical deflection signal corresponding to a deflection of the deflected detecting light. The processor is configured to receive the optical deflection signal, analyze the optical deflection signal and determine a heat value corresponding to the specific position out side the surface of the cell according to the optical deflection signal.

20 Claims, 8 Drawing Sheets

METHOD AND SYSTEM FOR MEASURING PHOTOTHERMAL DEFLECTION

This application claims the benefit of Taiwan Patent Application Serial No. 106125647, filed on Jul. 29, 2017, the subject matter of which is incorporated herein by reference.

BACKGROUND OF INVENTION

1. Field of the Invention

The present invention is related to a thermal detection technology, and more particularly to a photothermal deflection measuring system and method for observing and measuring micro-scaled thermal emission of a stimulated object arranged on a positioning structure formed on a substrate.

2. Description of the Prior Art

With great innovation and progress of biotechnology, medical biotechnology applied in the cell is also ever-changing, in which, through physically stimulating cell technology, such as operation of sound, light, electrical energy, heat, and magnetic field, for example, benefits of cell therapy, hyperplasia, cellular differentiation, and cytothesis can be effectively achieved.

However, when the cells are physically stimulated by the energy, a great portion of the energy is converted into heat energy that might be accumulated to affect the cell. For example, the accumulated heat will easily changes the internal structure of the cell and function of enzyme-like protein thereby affecting cell growth or causing somatic mutation. Therefore, the main target in the micro-scaled thermal medical engineering is to completely reveal the influence of the heat on the vital activity of single cell or less amount of cells.

Different techniques to solve the heat influence on the testing object are progressed and developed for a long period of time. For example, C. Wang et al. (2011) and A. Binslem et al. (2014) have developed a nano-thermocouple needle with accuracy of 0.01~0.1° C. for directly detecting temperature of a single cell. In addition, other technique such as scanning thermal microscopy (SThM) utilizing semiconductor element, for example, is utilized to detect thermal gradient of a single cell; however, the SThM system utilizes a thin filmed scanning needle having a complex structure and requiring a complicated manufacturing process.

Moreover, T. Ono et al. (2012) disclosed a Pico calorimeter for detection of heat produced in an individual brown fat cell to which norepinephrine is provided. D. Kim et al. (2013) disclosed a thesis about thermal conductivity of single biological cells and relation with cell viability. The measurement uses the three-omega method with a nanoscale thermal sensor and a micro-well structure that confines the cell whereby different electrical pumping current is input into the cell and a variation of electrical resistance is measured for calculating a heat conducting property with respect to the cell. Although the above-mentioned measures can measure heat energy generated from the cell, there still exist some issues concerned in this field. For example, despite the fact that the organelle is protected by the cell membrane, when the detecting needle contacts the cell directly, the cell membrane will be easily destroyed such that the cell is damaged. Meanwhile, since it is necessary to input additional pumping current into the cell in Kim's disclosure, the pumping current will be possible to induce inaccuracy energy while measuring the heat energy of a single cell. In addition, the liquid environment around the cell sample will directly make the optical deflection signal hard to be judged regardless of contacting measurement such as detecting needle, or direct measurement such as circuits is utilized.

In addition to the above-mentioned contacting measurement, L. V. Wang et al. (2013) provides a photoacoustic thermometry system in which a supersonic detector is utilized to detect the variation of supersonic signal when the single cell is stimulated by heat. Although the system is a innovated measure for detecting heat generated by the single cell through contactless way, the accuracy of detected temperature can merely to 0.2° C.

Accordingly, there has a need for developing a contactless with high accuracy measuring system for detecting heat generated by a cell.

SUMMARY OF THE INVENTION

The present invention provides a photothermal deflection measuring system for determining a heat generating status or thermal gradient distribution outside a surface of an object such as cell, for example, through a contactless way. In one embodiment, the system can output an image with respect the thermal gradient distribution or heat distribution through a plurality of heat values, each of which is calculated from a deflection of detecting light passing through a specific position outside the surface of the object. In addition to measuring micro-scale heat variation of a cell, the present invention can also be integrated into a microscope system for qualitatively observing bio-reaction mechanism of vital cell under different physical stimulation for a long period of time. For example, in one embodiment, a heat-resistance of the organelle and a creation of heat shock protein can be observed through the present system and method whereby the heat influence on the organelle or heat shock protein or a reaction of heat factor inside the cell can be clarified thereby understanding the real reaction inside the cell induced by heat factor. Moreover, the micro-scale heat conducting theory model as well as the real measured heat generated information can be mutually verified and modified.

The present invention provides a contactless photothermal deflection measuring system that integrates a fluorescent microscope platform for observing and measuring micro-scale heat generated by a vital cell under a physical stimulation such as electric stimulation, optical stimulation, or magnetic stimulation, or chemical reaction. When the heat inducing source stimulates the cell with a fixed frequency, a periodical heat variation is occurred within the cell and the heat is conducted to the outer surface of the cell and emitted therefrom whereby a refractive index gradient of the medium around the cell will be generated with respect to the frequently changed heat. Accordingly, when a detecting light is projected onto a specific location within the area having the refractive index gradient variation, the detecting light will be deflected. Then, a deflection detecting sensor is utilized to detect the deflection of the deflected light thereby generating corresponding optical deflection signal. The optical deflection signal is then recorded and processed to calculate the micro-scale heat variation according to the optical deflection signal through a lock phase amplifier. Since the photothermal deflection measuring system is integrated with the microscope platform, the cell can be observed immediately or for a long period of time whereby a heat influence on the cell status, cell reaction or cell life cycle of single cell under various kinds of heat emitting condition can be discovered.

In one embodiment, the present invention provides a photothermal deflection measuring system comprises a substrate, a detecting light source, a detecting unit, a processor. The substrate has a plurality of positioning structure, each of which is utilized to support an object emitting heat wherein the emitted heat forms a thermal field. The detecting light source is utilized to generate a detecting light and project the detecting light onto a specific position of the thermal field wherein the detecting light is deflected while passing through the thermal field. The detecting unit receives the detecting light passing through the specific position and generates an optical deflection signal with respect to a deflection of the received detecting light. The processor is electrically coupled to the detecting unit for determining a heat value with respect to the specific position according to the optical deflection signal.

In one embodiment, the detecting unit further comprises a position detector, and a signal processing circuit, wherein the position detector detects a deflection value of the deflected detecting light with respect to the specific position and generates an electrical signal corresponding to the deflection value while the signal processing circuit is utilized to amplify the electrical signal for obtaining the optical deflection signal associated with respect to the deflection value of the received detecting light.

In one embodiment, the system further comprises an image acquiring unit for acquiring an image of the object.

In one embodiment, the positioning structure comprises a recess structure having an opening, and a supporting frame having a plurality of cantilever arms respectively coupled to a periphery of the opening of the recess structure. Each supporting frame is utilized to support the object, wherein each supporting frame further comprises a first electrode and a second electrode coupled to the periphery of the opening of the recess structure and a carrier is formed between the first electrode and the second electrode.

In one embodiment, the system further comprises an electric stimulation device for inputting an electric stimulation signal to each supporting frame thereby stimulating the object supported thereon to generate and emit heat.

In one embodiment, each object further comprises a plurality of magnetic particles. The system further comprises an alternative magnetic field generator for generating an alternative magnetic field acting on the object whereby the plurality of magnetic particles acted by the alternative magnetic field are induced to generate heat energy.

In one embodiment, the processor further establishes a thermal image having heat distribution with respect to the object according to the heat values corresponding to the optical deflection signal.

In one embodiment, the positioning structure is a microscale gripper, or fiber structure.

In one embodiment, the system further comprises a heat generating means for stimulating the object to emit heat, wherein the heat generating means utilizes light, alternative magnetic field, chemical agent, or electrical energy to stimulate the object.

All these objects achieved by photothermal deflection measuring system according to the present invention are described below.

BRIEF DESCRIPTION OF THE DRAWINGS

The present invention will now be specified with reference to its preferred embodiment illustrated in the drawings, in which:

FIGS. 2A(a)-2A(e) illustrate a manufacturing process of the positioning structure according to one embodiment of the present invention.

DESCRIPTION OF THE PREFERRED EMBODIMENT

The invention disclosed herein is directed to photothermal deflection measuring system and method. In the following description, numerous details corresponding to the aforesaid drawings are set forth in order to provide a thorough understanding of the present invention so that the present invention can be appreciated by one skilled in the art, wherein like numerals refer to the same or the like parts throughout.

Although the terms first, second, etc. may be used herein to describe various elements, components, modules, and/or zones, these elements, components, modules, and/or zones should not be limited by these terms. Various embodiments will now be described in conjunction with a number of schematic illustrations. The embodiments set forth the photothermal deflection measuring system different from the conventional approaches. Various embodiments of the application may be embodied in many different forms and should not be construed as a limitation to the embodiments set forth herein.

Figure 1A:
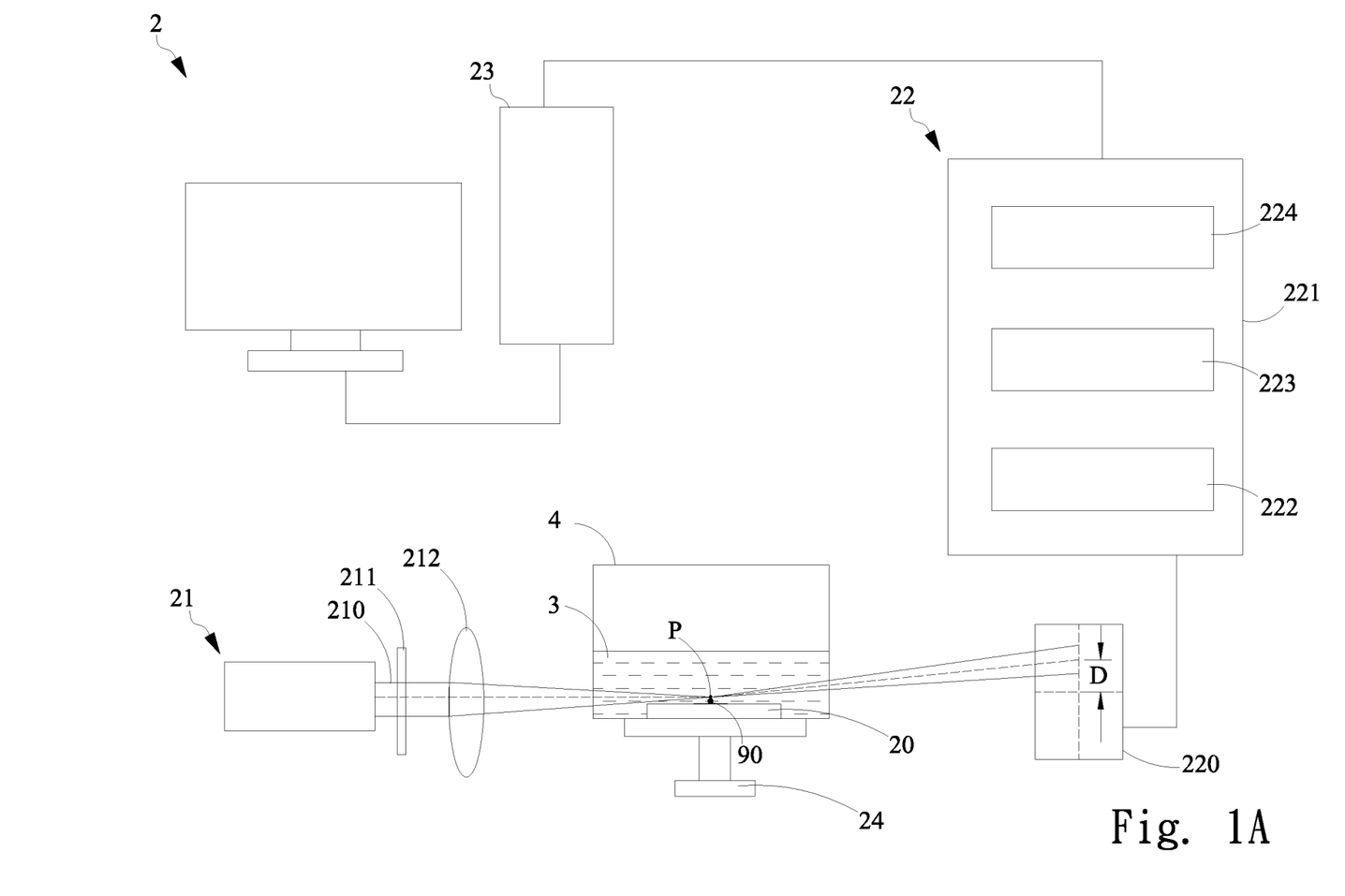
FIG. 1A illustrates a photothermal deflection measuring system according to one embodiment of the present invention.

Please refer to FIG. 1A, which illustrates a photothermal deflection measuring system according to one embodiment of the present invention. In the present embodiment, the photothermal deflection measuring system comprises a substrate 20, a detecting light source 21, a detecting unit 22, and a processor 23. The substrate 20 is arranged on a supporting platform 24 available for performing at least one dimensional movement so as to adjust the position of the substrate 20. In the present embodiment, the supporting platform 24 can be operated to perform multi-dimensional movements including movement along X, Y, or Z axis or a combination of movement along X, Y, and Z axes and rotation about X, Y, or Z axis, or at least two axes thereof whereby the position of the substrate 20 can be adjusted.

Figure 1B:
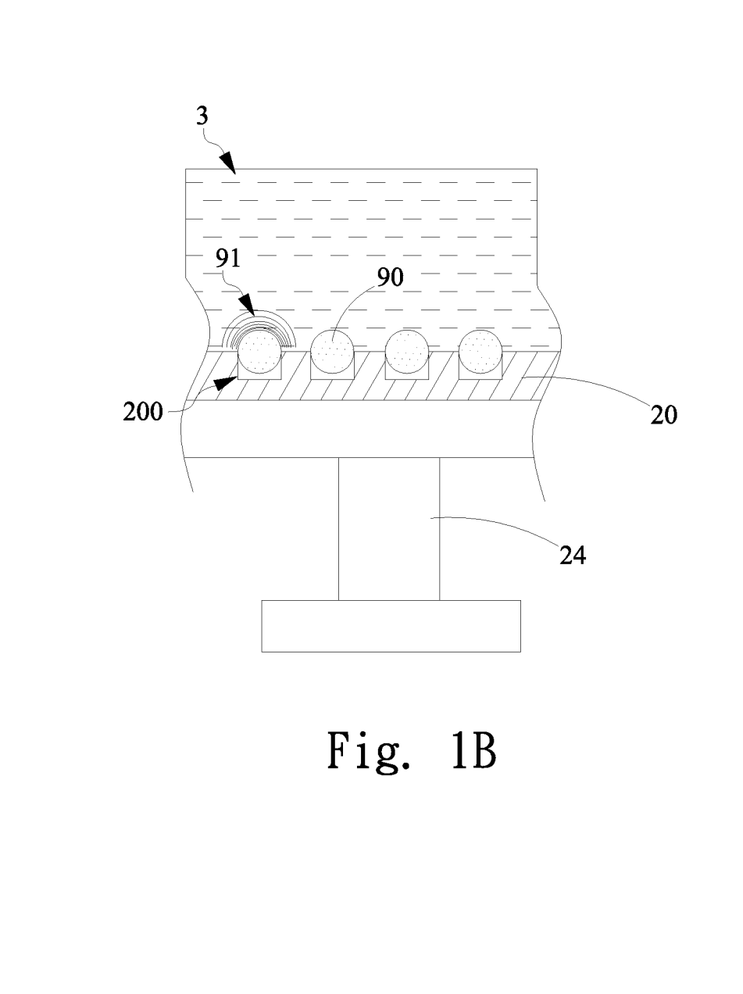
FIG. 1B illustrates a cross-section layout of the substrate according to one embodiment of the present invention.

Please refer to the FIG. 1B, which illustrates a cross-sectional layout of the substrate according to one embodiment of the present invention. The substrate 20 comprises a plurality of positioning structures 200. In one embodiment, the plurality of positioning structures 200 are arranged as a two-dimensional array distribution. Each positioning structure 200 is capable of supporting an object emitting heat that forms a thermal field outside the object. In one embodiment, the object can be, but should not be limited to, a cell 90, such as bacteria, protein, and etc. In one embodiment, since the heat is emitted form the cell 90 for forming the thermal field, a thermal gradient distribution 91 is formed over the surface of the cell 90. It is noted that, the way for enabling the cell 90 to generate heat can be, but should not limited to, a physical stimulation, such as electric stimulation, magnetic stimulation (e.g. alternative magnetic filed) or optical stimulation acting on the cell 90, or a chemical reaction of chemical medicine. Once the cell 90 is stimulated to generate heat, the thermal gradient distribution 91 will be formed over the surface of the cell 90 whereby the medium 3 within the container 4 surrounding the cell 90 will absorb the heat energy emitted from the cell 91 and the temperature of the medium 3 surrounding the cell 90 will be varied in response to the heat distribution over the surface of the cell 90 whereby the thermal gradient distribution 91 of the medium 3 is formed as well as the refractive rate of the medium will also be varied in response to the thermal gradient distribution 91.

The substrate 20, in one embodiment, can be, but should not be limited to, a silicon substrate. In the present embodiment, the positioning structure 200 is a recess structure. In one embodiment, the recess structure can be formed through a semiconductor manufacturing process. For example, please refer to FIGS. 2A(a)-2A(e), which illustrate a manufacturing process of the positioning structure according to one embodiment of the present invention. In the first step shown in FIG. 2A(a), a photoresist layer 201 is formed on the substrate 20. Then, the second step shown in FIG. 2A(b) illustrates that a mask 202 is utilized for exposure process in order to form a plurality of photoresist recess structures 203 shown in FIG. 2A(c). The light for projecting on the photoresist layer 201 can be, but should not be limited to, ultraviolet light. Next, in the step shown in FIG. 2A(d), an etching process is performed to etch the exposed area of the substrate 20 corresponding to the photoresist recess structure 203 thereby forming the plurality of recess structures i.e. the positioning structures 200 shown in FIG. 2A(e).

Figure 2A:
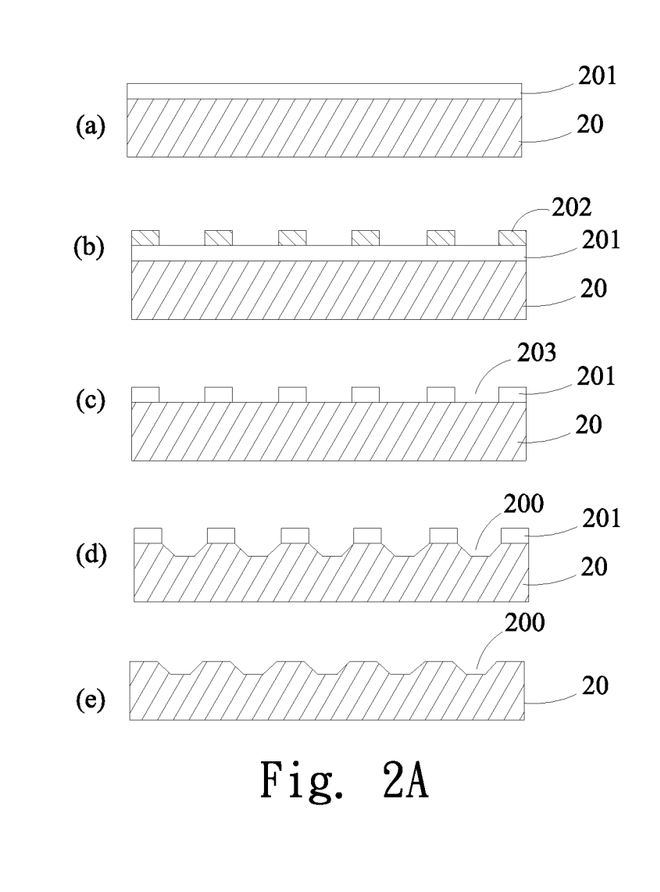
Figure 2B:
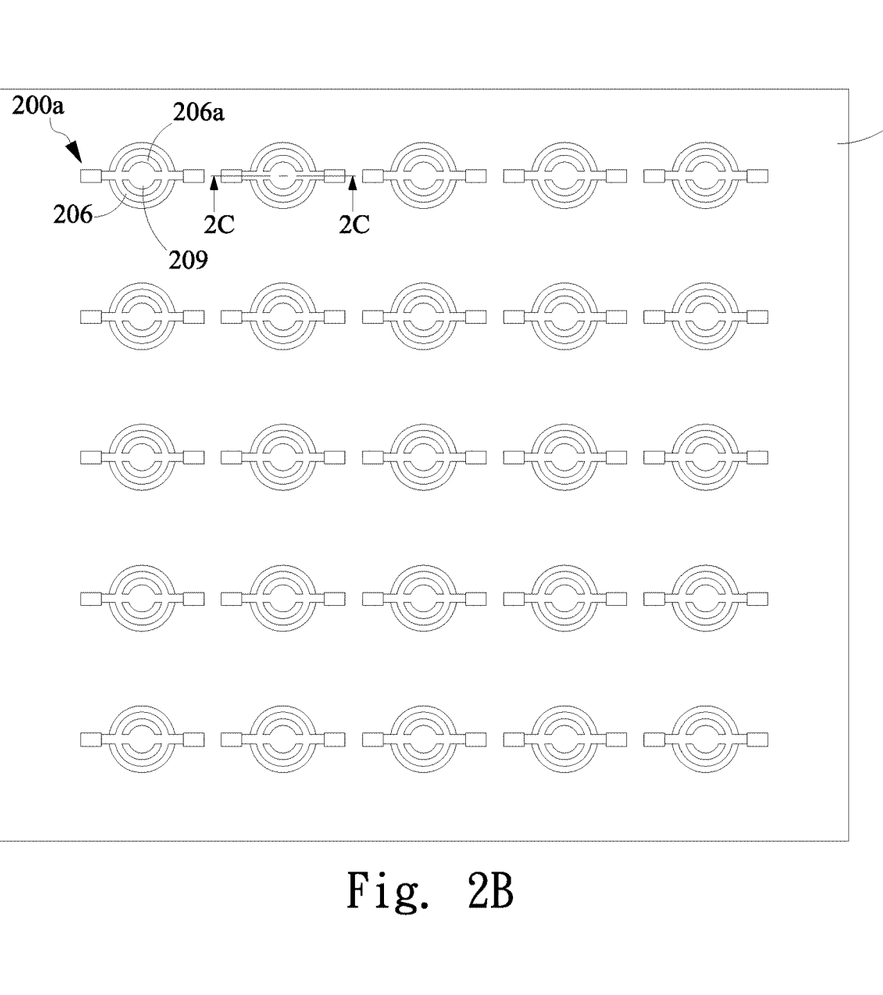
FIG. 2B illustrates a top view structure of the positioning structure according to one embodiment of the present invention.
Figure 2C:
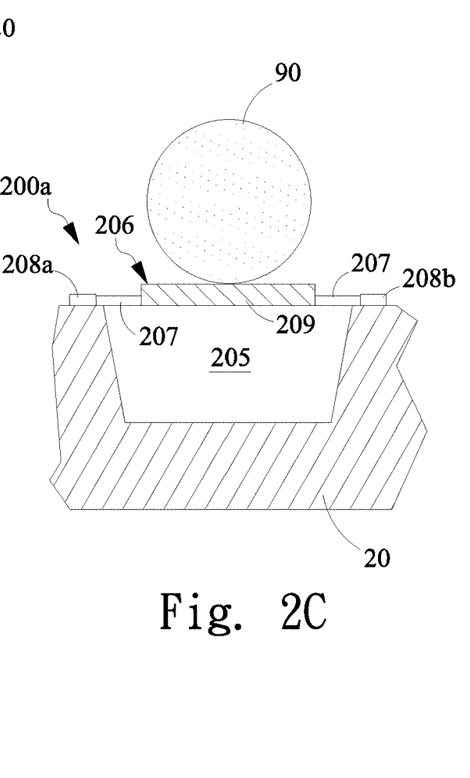
FIG. 2C illustrates a cross-section view of the positioning structure shown in FIG. 2B.

In another embodiment, for example, please refer to the FIGS. 2B and 2C, in which FIG. 2B illustrates a top view structure of the positioning structure according to one embodiment of the present invention while FIG. 2C illustrates a cross-sectional view of the positioning structure shown in FIG. 2B. In the present embodiment, the positioning structure 200a further comprises a supporting frame 206 in addition to the recess structure 205. The supporting frame 206 is arranged on the top of the recess structure 205. In one embodiment, each supporting frame 206 comprises a plurality of cantilever arms 207 coupled to a periphery of the opening of the recess structure 205 and a supporting carrier 209 coupled to the cantilever arms 209 for supporting the cell 90. The supporting carrier 209 is supported by the plurality of cantilever arms 207. Each supporting frame 206 further comprises a first electrode 208a and a second electrode 208b coupled to the periphery of the opening of the recess structure 205 and the carrier 209 is formed between the first electrode 208a and the second electrode 209b and is electrically coupled to the first and second electrodes 208a and 208b through the cantilever arms 207.

In the next, the way for forming the positioning structures 200a shown in FIGS. 2B and 2C are described below. At first, an array having a plurality of pairs of electrodes for performing electric stimulation on the object are formed on the substrate 20 through an electron beam evaporation process in which each electrode is formed by evaporating chromium (Cr) with thickness of 10 nm and gold (Au) with thickness of 100 nm. Next, a photoresis layer is formed on the substrate 20. Then, a mask is utilized so that an exposure process and an etching process are subsequently performed for forming a plurality of photoresist recess structures. Each photoresist recess structure is corresponding to the pair of electrodes. The light for projecting on the photoresist layer can be, but should not be limited to, ultraviolet light. After that, a metal layer is formed on a top of each photoresist recess structure and is electrically coupled to the corresponding pair of electrodes. Then the photoresis layer is removed and a plurality of holes 206a is formed on the metal layer. The metal layer formed in the photoresist recess structure has a physical layout of the supporting frame 206 shown in FIGS. 2B and 2C. Taking FIG. 2B as an example, since the plurality of holes 206a are formed on the supporting frame 206, each recess structure 205 corresponding to the supporting frame 206 can be formed through the etching process wherein the etching liquid is capable of passing through the holes 206a so as to etch the substrate 20 corresponding to the supporting frame 206 thereby forming the recess structure 205. After that, the supporting frame 206 with a supporting carrier 209 for supporting the object such as cell 90 and recess structure 205 are completely formed.

Please refer back to FIG. 1A. The detecting light source 21 is utilized to generate a detecting light 210 and project the detecting light 210 onto a specific position P of the thermal field. It is noted that since the medium around the cell 90 will absorb heat energy thereby generating a thermal gradient distribution in response to the thermal field distribution around the surface of the cell 90, the refractive rate of the medium around the cell 90 will also be varied in response to the thermal gradient distribution. Therefore, when the detecting light 210 is projected onto the specific position P within the thermal field, the detecting light 210 will be refracted to have deflection D in response to the corresponding refractive rate of the specific position P. In one embodiment, the detecting light source 21 is a laser, such as He—Ne laser, for example, but should not be limited thereto. In order to eliminate the heat accumulation of the laser detecting light 210 during the inspection, an attenuator 211 is adapted for reducing the optical strength of the laser detecting light 210. After the laser detecting light 210 passes through the attenuator 211, it is forced on a specific position P through a focusing lens 212. The detecting unit 22 is utilized to receive the detecting light 210 passing through the specific position P for measuring the deflection D of the detecting light 210. The deflection D can be adapted for analyzing a heat value corresponding to the specific position P.

In one embodiment, the detecting unit 22 further comprises a position detector 220 and a signal processing circuit 221. The position detector 220 is utilized to detect the deflection D and generate an electrical signal corresponding to the deflection D. The signal processing circuit 221 is utilized to amplify the electrical signal for obtaining an optical deflection signal. In one embodiment, the amplifying process is a lock-in phase amplifying process. In one embodiment, the processing circuit 221 further comprises a preamplifier 222, voltage meter 223 electrically coupled to the preamplifier 222, and a lock-in phase amplifier 224 electrically coupled to the voltage meter 223 and the processor 23.

Since the optical deflection effect is occurred due to the heat emitted from the cell, the position detector 220 receives the deflected light passing through the specific position P over the surface of the cell and generates an electrical signal corresponding to the deflected light. The electrical signal is processed by the preamplifier 222. Then, the voltage meter 223 reads the voltage of processed electrical signal. The lock-in phase amplifier 224 acquires the weak electrical signal and amplifies the acquired electrical signal so as to form an optical deflection signal. The processor 23, a computing device in one embodiment, for example, is utilized to execute a processing program for processing the optical deflection signal from the lock-in phase amplifier 224 and analyzing a deflection value corresponding to the optical deflection signal. Once the deflection value is determined, a heat value with respect to the specific position P can be determined by the processor 23 according to a heat and optical deflection relationship data. Moreover, once the heat value is determined, the power of heat generation of the cell 90 can be calculated as well. It is noted that the heat and optical deflection relationship data can be previously established according to medium material with various kinds of temperature condition.

By utilizing the positioning structure shown in FIGS. 2A(e), the cell 90 arranged thereon can be stimulated to generate heat through chemical stimulation such as chemical medicine or physical stimulation such as optical stimulation or supersonic stimulation, for example. The processor 23 can further establish a thermal distribution image corresponding to outer space of the cell 90 arranged on the positioning structure 200 or 200a according to the power of heat generation obtained from the deflection with respect to different specific positions in the outer space of the cell 90. In one embodiment, the processor receives the optical deflection signal and performs an image expression process according to the received optical deflection signal, thereby forming the thermal distribution image. In one embodiment, the image expression process converts the optical deflection signals into power of heat generation, which is described previously. The thermal distribution image can be transmitted to a display so that the user can visually recognize the thermal distribution around the cell 90. The thermal distribution image can be a two-dimensional thermal distribution around the cell 90 or three-dimensional thermal distribution around the cell 90. In one embodiment, the thermal distribution image can show different colors respectively corresponding to the heat amount or temperature scale with respect to the different positions outside the surface of the cell or object.

Figure 3:
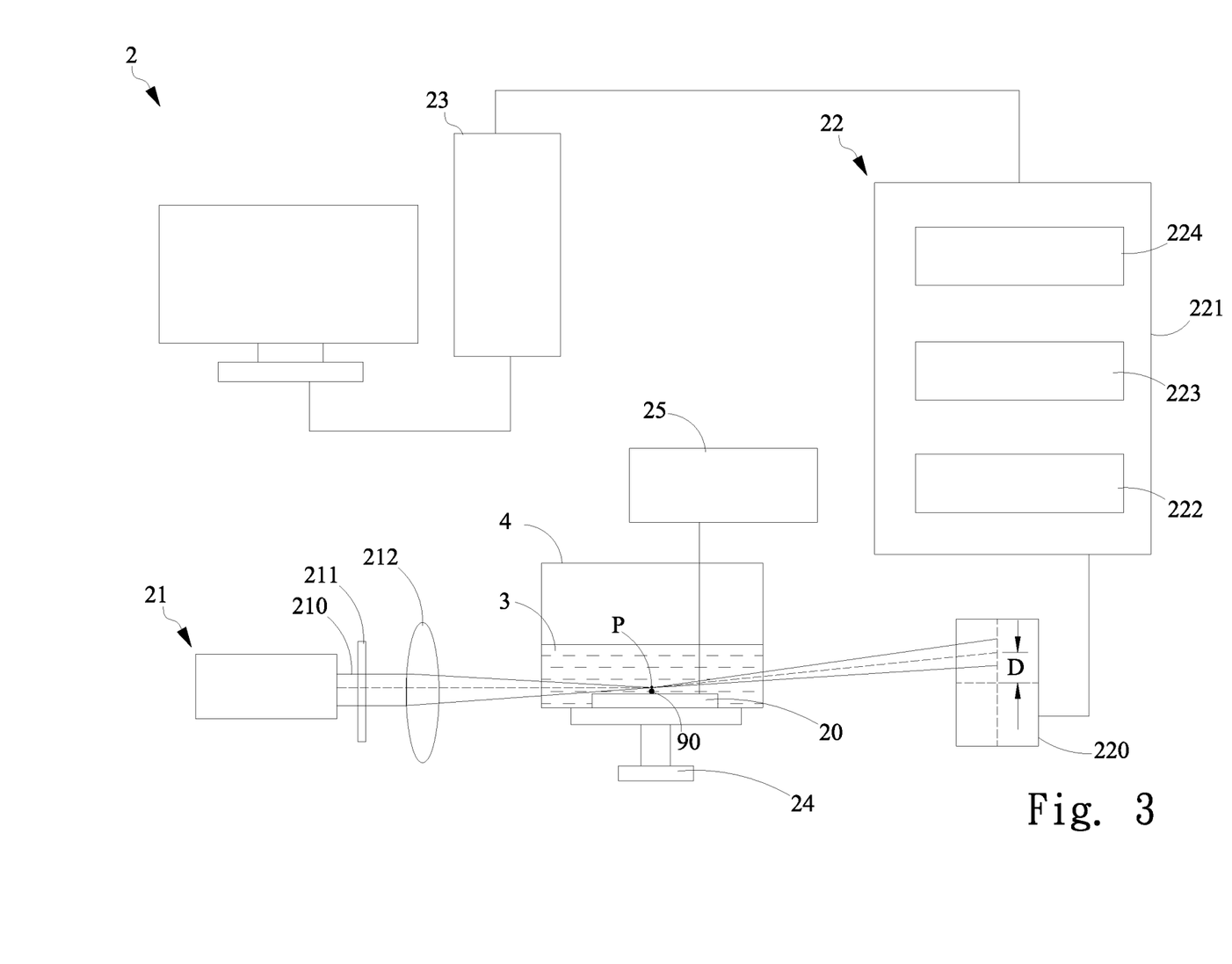
FIG. 3 illustrates a photothermal deflection measuring system according to another embodiment of the present invention.

In one alternative embodiment, taking the positioning structure shown in FIGS. 2B and 2C as an example for explaining the heat generated from the cell arranged on the positioning structure under an electric stimulation, the positioning structure shown in FIGS. 2B and 2C is arranged in the system shown in FIG. 3. In the present embodiment shown in FIG. 3, the system 2 further comprises an electric stimulation device 25 electrically coupled to the electrodes 208a and 208b for providing electric stimulation signal to the supporting frame 26 whereby the cell 90 is stimulated to generate and emit heat. In one embodiment, the electric stimulation device 25 is capable of adjusting various parameters with respect to the electric stimulation signal such as voltage, electric pulse width, frequency, and delay time for controlling the electric stimulation signal. In one embodiment, the amplitude range of the electric voltage is between ±20 volts, the frequency is set to be 50 Hz, and the pulse width is set to be 5 ms. When the electric stimulation device 25 is electrically coupled to the supporting frame 26, the voltage of the electric stimulation signal is adjusted to vary from the 10 V to 20 V so as to provide different electric stimulation signals, whereby the heat emission from the cell 90 arranged on the supporting frame 26 to the liquid medium surrounding the cell 90 under different electric stimulation signals can be measured. It is noted that the variation of the voltage range depends on the user's need, and it will not be limited to the previous described embodiment.

Figure 4:
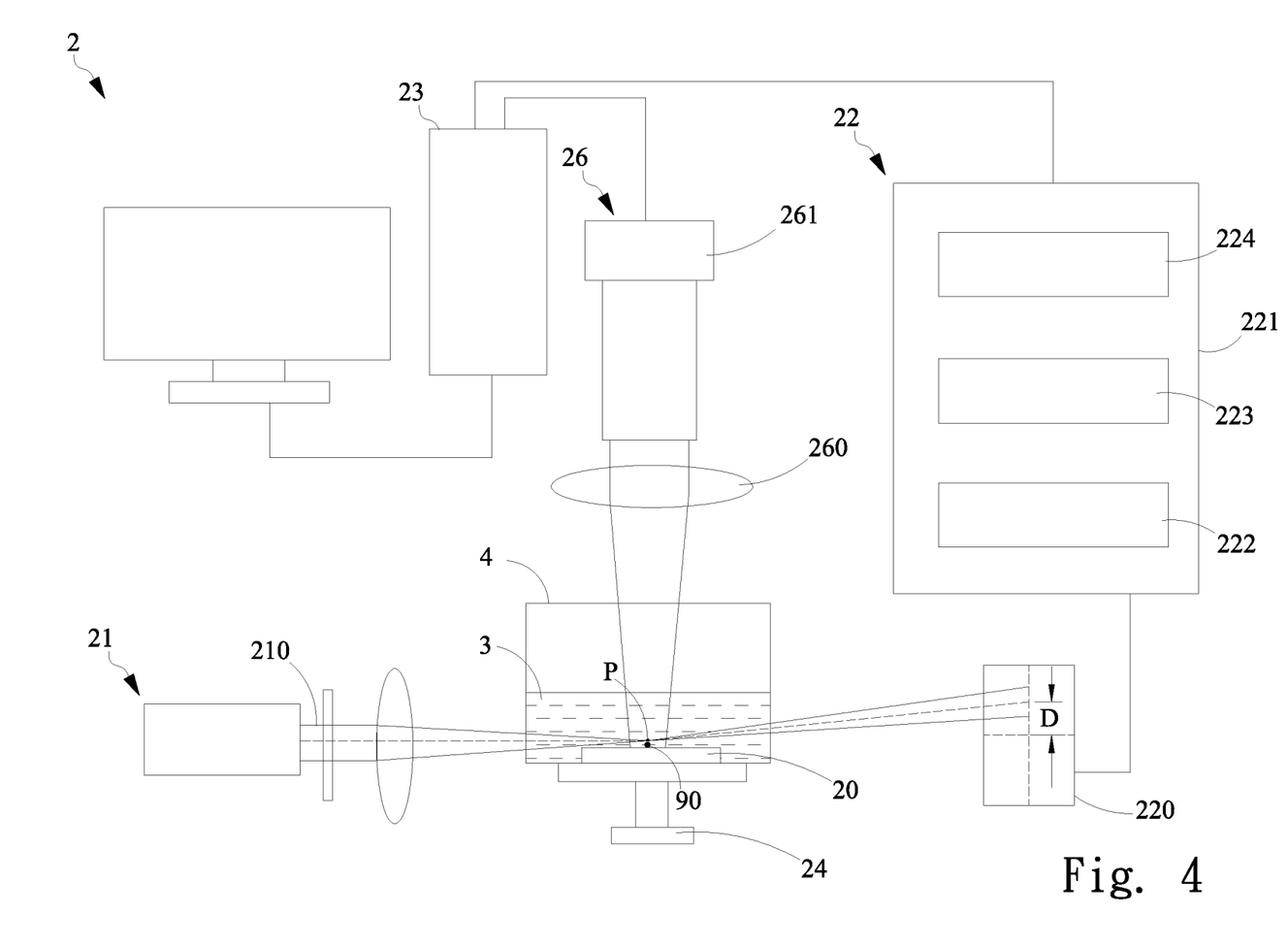
FIG. 4 illustrates a photothermal deflection measuring system according to a further embodiment of the present invention.

In addition, one alternative embodiment shown in FIG. 4 illustrates a photothermal deflection measuring system according to a further embodiment of the present invention. In the present embodiment, basically, it is almost the same as the embodiment shown in FIG. 1A. The different part is that the system 2 in FIG. 4 further comprises a micro-image acquiring device 26 including a microscope 260 and image acquiring device 261 for acquiring the object image.

Through the image acquired and generated by the micro-image acquiring device 26, the user can qualitatively observe the reaction mechanism of the cell under different kinds of physical stimulation, wherein the reaction mechanism includes a heat-resistance of the organelle and a creation of heat shock protein. Since the reaction mechanism such as heat-resistance of the organelle and creation of heat shock protein can be quantitatively observed, the heat influence on the organelle or heat shock protein can be clarified when the cell is stimulated, and a reaction of heat factor inside the cell can be further verified whereby the micro-scale heat conducting theory model within the cell and the real measured heat generated information can be mutually verified and modified. It is noted that, in configuration of system shown in FIG. 4, the substrate 20 can be the structure shown in FIG. 2A(e) or 2C. When the substrate shown in FIG. 2C is utilized, the parameters of the electric stimulation signal adapted to stimulate the cell to generate heat can be adjusted through the electric stimulation device 25.

Figure 5:
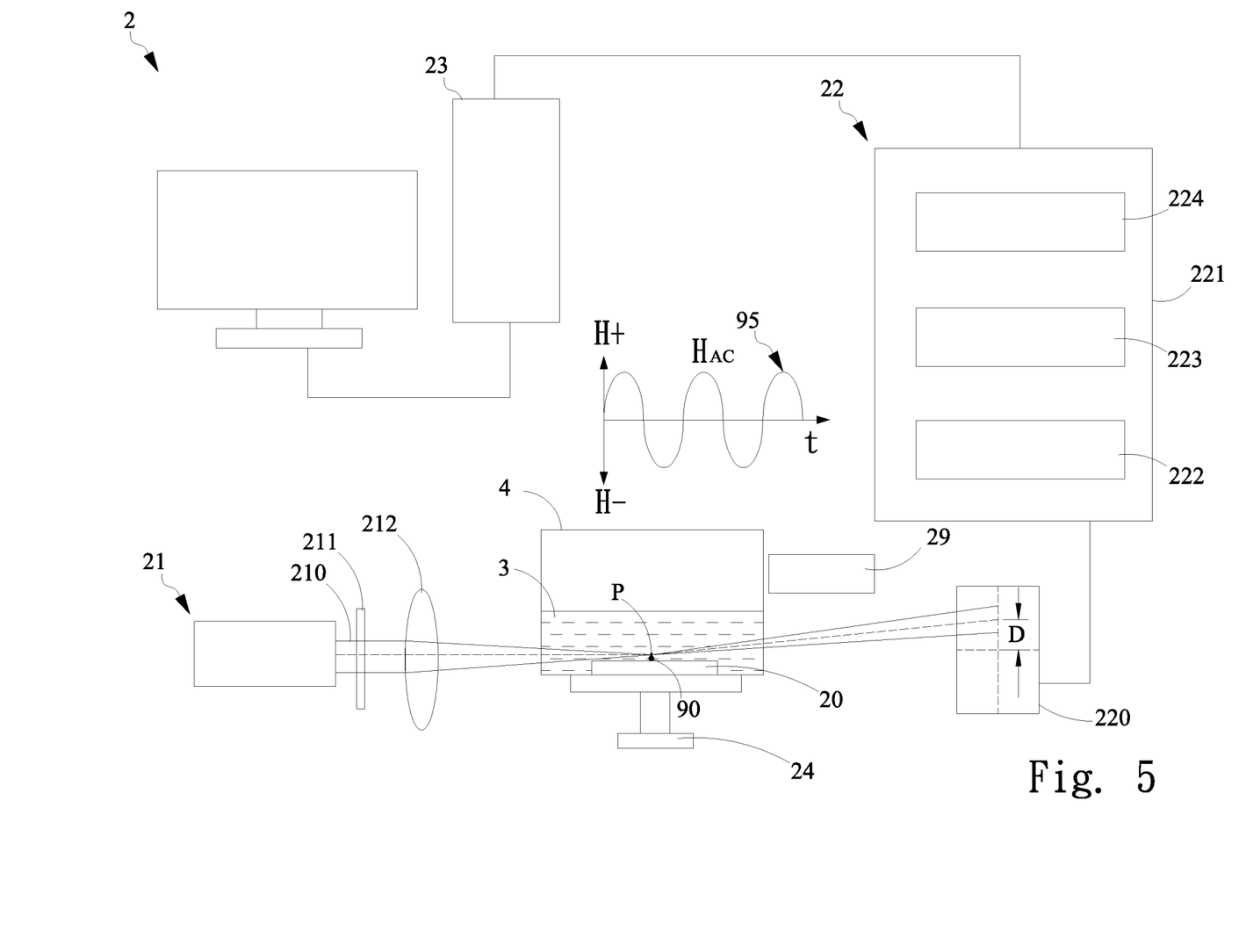
FIG. 5 illustrates a photothermal deflection measuring system according to one further embodiment of the present invention.

Please refer to FIG. 5, which illustrates a photothermal deflection measuring system according to a further embodiment of the present invention. In the present embodiment, basically, it is almost the same as the embodiment shown in FIG. 1A. The different part is that the object supported by the supporting frame shown in FIG. 5 further comprises a plurality of magnetic particles which can be, but should not limited to, the nano-magnetic particles. In addition, the system 2 in FIG. 5 further comprises a magnetic field generating device 29 for generating alternative magnetic field. It is noted that in the embodiment shown in FIG. 5, the supporting frame 26 can be the structure shown in FIG. 2A or 2B, but should not be limited thereto. In addition, the system shown in FIG. 5 can also comprise the micro-image acquiring device 26 shown in FIG. 4, although the device 26 is not shown in FIG. 5. In the present embodiment, the magnetic field generating device 29 generates alternative magnetic field 95 having frequency 42 KHz for inducing the magnetic particles inside the cell 90 subjected thereto to generate heat thereby elevating the temperature of the cell 90. The heat generating rate or variation of the temperature of the cell 90 or temperature of environment around the cell 90 can be measured by the system shown in FIG. 5.

In one embodiment, the cell is a cancer cell. It is noted that the alternative magnetic field and magnetic particles can be adapted to heat treatment application for curing the cancer diseases. However, it is a topic that whether the normal cells or organs around the cancer cells will be killed or not during the heat treatment. Accordingly, through the photothermal deflection measuring system utilized to evaluate the heat damage during the heat treatment in a single cell scope, the necessary heat energy without damaging the normal cells or organs during the proceeding the heat treatment can be determined thereby increasing the efficiency of treatment. It is noted that, in some embodiments, the alternative magnetic field, can al so be utilized to the objects having no magnetic particles. For example, by means of a specific magnitude of alternative magnetic field, the object can be stimulated to generate resonant effect thereby resulting in heat emission.

Figure 6A:
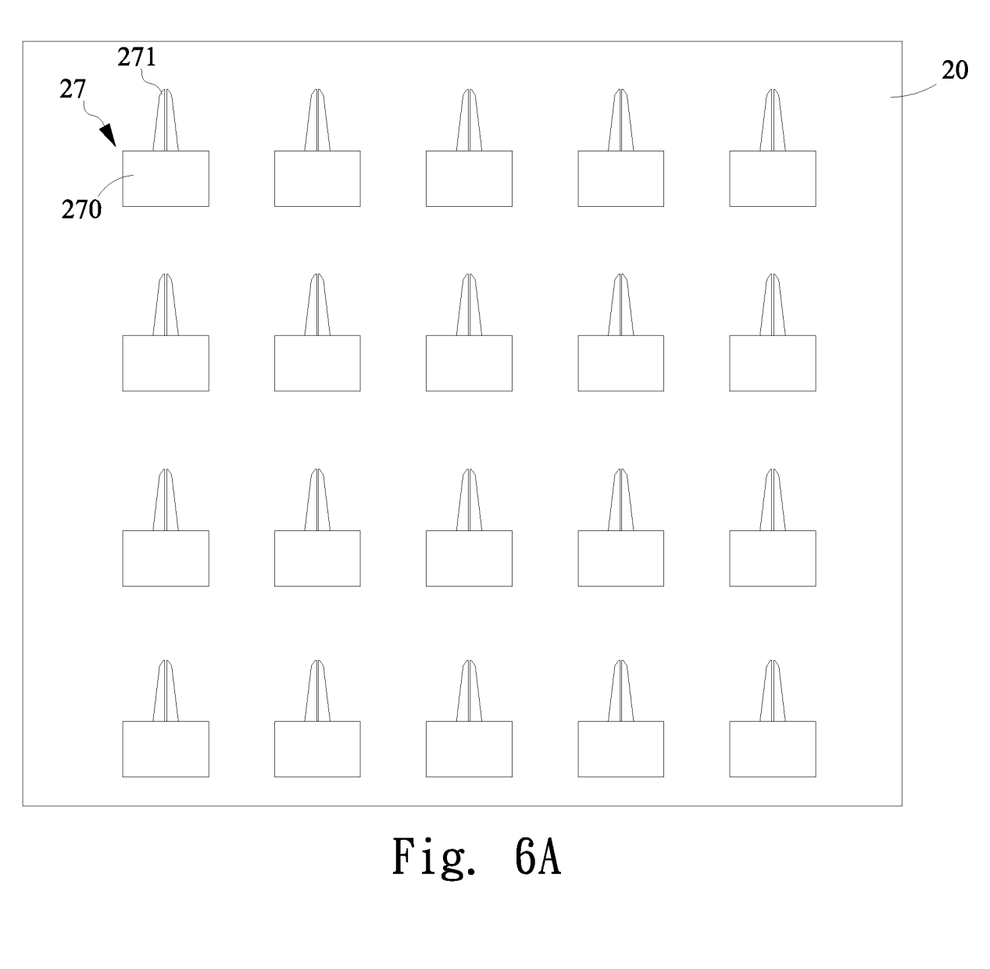
FIGS. 6A and 6B illustrate a positioning structure according to another embodiment of the present invention.
Figure 6B:
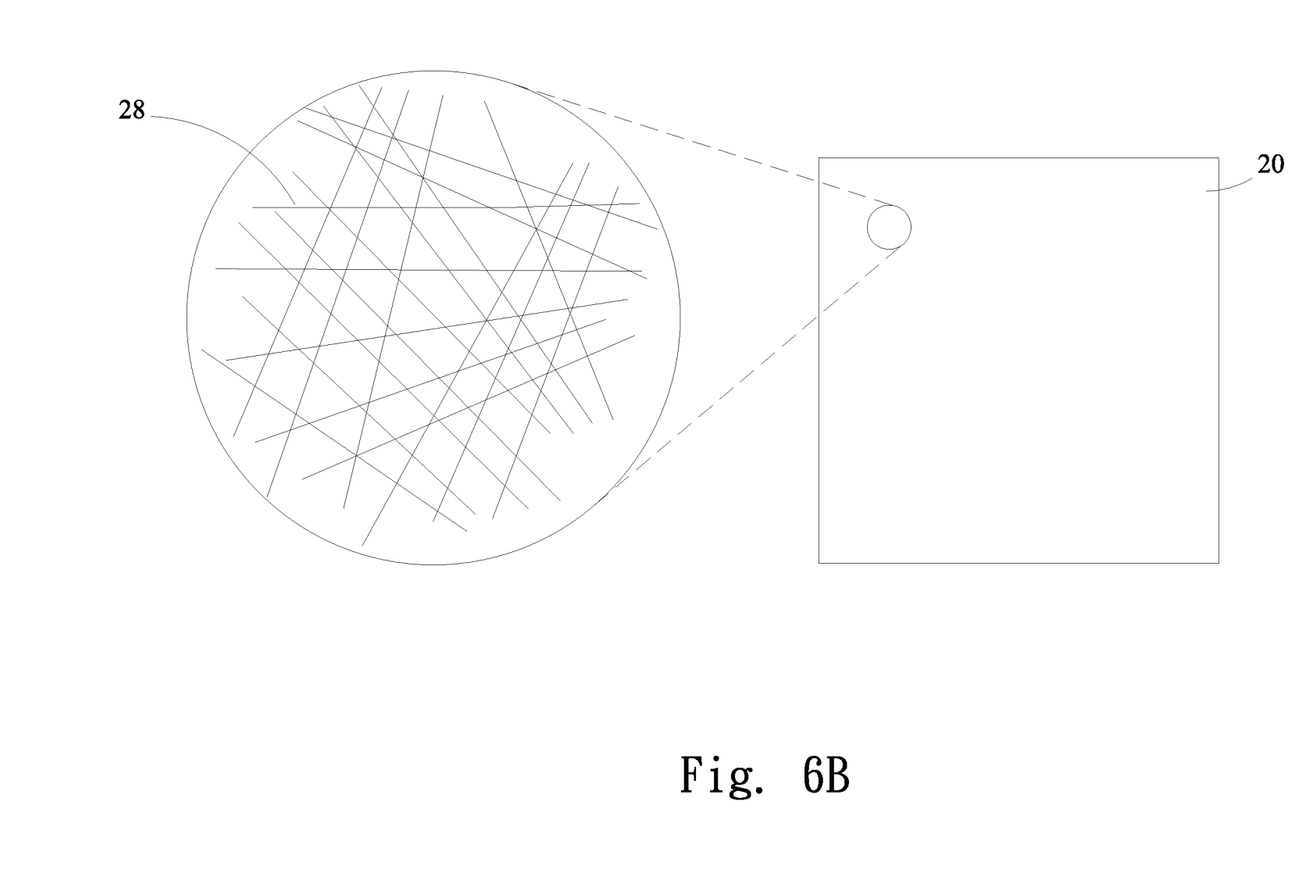

Please refer to FIGS. 6A and 6B which illustrate a positioning structure according to another embodiment of the present invention. In FIG. 6A, the positioning structure 27 is a micro-scale gripper, which comprises a driving part 270 and a gripping part 271. The driving part 270 can be operated to driving the gripping part 271 to grip the object through electric energy, magnetic energy, or heat energy. Alternatively, in the embodiment shown in FIG. 6B, the substrate 20 having positioning structures 28 made from micro-scale or nano-scale fibers for supporting the objects such as protein, for example.

While the present invention has been particularly shown and described with reference to a preferred embodiment, it will be understood by those skilled in the art that various changes in form and detail may be without departing from the spirit and scope of the present invention.

What is claimed is:

1. A photothermal deflection measuring system comprising:
    a substrate, having a plurality of positioning structures, each of which is utilized to support an object emitting heat wherein the emitted heat forms a thermal field for changing a gradient of a refractive index of a medium around the object;
    a detecting light source, generating a detecting light and projecting the detecting light onto a specific position of the thermal field wherein the detecting light is refracted to have a deflection in response to the corresponding refractive index of the specific position while passing through the specific position of the thermal field;
    a detecting unit, receiving the detecting light passing through the specific position and generating an optical deflection signal with respect to a deflection value of the received detecting light; and
    a processor, electrically coupled to the detecting unit for determining a heat value with respect to the specific position according to the optical deflection signal.

2. The system of the claim 1, wherein the detecting unit further comprises:
    a position detector, detecting the deflection value of the received detecting light with respect to the specific position and generating an electrical signal corresponding to the deflection value; and
    a signal processing circuit, utilized to amplify the electrical signal for forming the optical deflection signal associated with the deflection value of the received detecting light.

3. The system of claim 1, further comprising a micro-image acquiring unit for acquiring an image associated with the object.

4. The system of the claim 1, wherein the positioning structure comprises a recess structure having an opening.

5. The system of claim 4, wherein the opening of each recess structure further comprises a supporting frame having a plurality of cantilever arms coupled to a periphery of the opening of the recess structure, and each supporting frame is utilized to support the object.

6. The system of claim 5, wherein each supporting frame further comprises a first electrode and a second electrode respectively coupled to the periphery of the opening of the recess structure and a carrier formed between the first electrode and the second electrode.

7. The system of claim 1, wherein the positioning structure is a micro-scale gripper, or fiber structure.

8. The system of claim 1, further comprising a heat generating means for stimulating the object to generate and emit heat.

9. The system of claim 8, wherein the heat generating means utilizes light, alternative magnetic field, chemical agent, or electrical energy to stimulate the object.

10. The system of claim 1, wherein the processor further establishes a thermal image having heat distribution with respect to the object according to the heat value corresponding to the optical deflection signal of the received detecting light passing through the specific position.

11. The system of claim 1, wherein the object further comprises a plurality of magnetic particles contained therein, and the system further comprises an alternative magnetic generating device for generating an alternative magnetic field inducing the object to emit heat.

12. A photothermal deflection measuring method for determining emitting heat comprising steps of:
    providing a substrate having a plurality of positioning structures, each of which is utilized to support an object, a detecting light source, a detecting unit, and a processor in electrical communication with the detecting unit;
    stimulating the object to generate and emit heat wherein the emitted heat forms a thermal field for changing a gradient of a refractive index of a medium around the object;
    enabling the detecting light source to generate a detecting light and to project the detecting light onto a specific position of the thermal field wherein the detecting light is refracted to have a deflection in response to the corresponding refractive index of the specific position while passing through the specific position of the thermal field;
    enabling the detecting unit to receive the detecting light passing through the specific position and to generate an optical deflection signal with respect to a deflection value of the received detecting light; and
    determining a heat value corresponding to the specific position according to the optical deflection signal by the processor.

13. The method of claim 12, wherein the way for stimulating the object is light, alternative magnetic field, chemical agent, or electrical energy.

14. The method of claim 12, wherein the processor further establishes a thermal image having heat distribution with respect to the object according to the heat value corresponding to the optical deflection signal of the received detecting light passing through the specific position.

15. The method of the claim 12, wherein the positioning structure comprises a recess structure having an opening.

16. The method of claim 15, wherein the opening of each recess structure further comprises a supporting frame having a plurality of cantilever arms coupled to a periphery of the opening of the recess structure, and each supporting frame is utilized to support the object.

17. The method of claim 16, wherein each supporting frame further comprises a first electrode and a second electrode respectively coupled to the periphery of the opening of the recess structure and a carrier formed between the first electrode and the second electrode.

18. The method of claim 12, wherein the object further comprises a plurality of magnetic particles contained therein, and the system further comprises an alternative magnetic generating device for generating an alternative magnetic field inducing the object to emit heat.

19. The method of claim 12, wherein the positioning structure is a micro-scale gripper, or fiber structure.

20. The method of the claim 12, wherein the detecting unit further comprises:
   a position detector, detecting the deflection value of the received detecting light with respect to the specific position and generating an electrical signal corresponding to the deflection value; and
   a signal processing circuit, utilized to amplify the electrical signal for forming the optical deflection signal associated with the deflection value of the received detecting light, and then transfer the optical deflection signal to an image expression.

* * * * *